(12) United States Patent
Muders et al.

(10) Patent No.: US 8,423,241 B2
(45) Date of Patent: Apr. 16, 2013

(54) SAFETY CONCEPT FOR AN INTELLIGENT ACTUATOR

(75) Inventors: Lutz Muders, Oberheimbach (DE);
 Stefan Grieser-Schmitz, Koblenz (DE);
 Marco Junglas, Koblenz (DE);
 Benedikt Ohlig, Vallendar (DE)

(73) Assignee: Lucas Automotive GmbH, Koblenz (DE)

( * ) Notice: Subject to any disclaimer, the term of this patent is extended or adjusted under 35 U.S.C. 154(b) by 306 days.

(21) Appl. No.: 12/747,251

(22) PCT Filed: Dec. 11, 2008

(86) PCT No.: PCT/EP2008/010540
 § 371 (c)(1),
 (2), (4) Date: Aug. 2, 2010

(87) PCT Pub. No.: WO2009/074323
 PCT Pub. Date: Jun. 18, 2009

(65) Prior Publication Data
 US 2010/0299024 A1 Nov. 25, 2010

(30) Foreign Application Priority Data
 Dec. 12, 2007 (DE) .......................... 10 2007 059 687

(51) Int. Cl.
 *G06F 7/00* (2006.01)
(52) U.S. Cl.
 USPC .......................................................... 701/36
(58) Field of Classification Search .................. None
 See application file for complete search history.

(56) References Cited

U.S. PATENT DOCUMENTS

| | | | |
|---|---|---|---|
| 6,550,870 B1 * | 4/2003 | Goodzey | 303/9 |
| 6,802,401 B1 * | 10/2004 | Bohm et al. | 188/158 |
| 6,955,148 B2 | 10/2005 | Rosenzopf et al. | |
| 2002/0022914 A1 * | 2/2002 | Kawada et al. | 701/41 |
| 2002/0092720 A1 * | 7/2002 | Schafer et al. | 188/158 |
| 2004/0201270 A1 * | 10/2004 | Suzuki et al. | 303/20 |
| 2006/0279136 A1 * | 12/2006 | Haeussler et al. | 303/20 |
| 2008/0105502 A1 * | 5/2008 | Koth et al. | 188/72.6 |

FOREIGN PATENT DOCUMENTS

| | | |
|---|---|---|
| DE | 19814657 A1 | 10/1999 |
| DE | 10023555 A1 | 1/2001 |
| DE | 10148646 A1 | 4/2003 |
| DE | 10333966 A1 | 2/2005 |
| EP | 1219518 A2 | 7/2002 |
| WO | 2004108497 A2 | 12/2004 |
| WO | 2006061238 A1 | 6/2006 |

* cited by examiner

*Primary Examiner* — Khoi Tran
*Assistant Examiner* — Adam Mott
(74) *Attorney, Agent, or Firm* — MacMillan, Sobanski & Todd, LLC (57) ABSTRACT

The present invention relates to an actuator device for use in a motor vehicle, comprising an actuator, a control unit for controlling the actuator and a processing unit, which is or can be connected to an external main control device via a control connection in order to transfer actuator setting commands. Furthermore, the processing unit is subordinate to the main control device and is connected to the control unit in order to control the actuator according to the actuator setting commands. The control unit is or can be connected to the main control device via an activation connection and is equipped so as to enable the actuator to be controlled by the processing unit according to activation signals transmitted via the activation connection.

20 Claims, 4 Drawing Sheets

SAFETY CONCEPT FOR AN INTELLIGENT ACTUATOR

CROSS-REFERENCE TO RELATED APPLICATIONS

This application is a national stage of International Application No. PCT/EP2008/010540 filed Dec. 11, 2008, the disclosures of which are incorporated herein by reference, and which claimed priority to German Patent Application No. 10 2007 059 687.3 filed Dec. 12, 2007, the disclosures of which are incorporated herein by reference.

BACKGROUND OF THE INVENTION

The present invention relates to an actuator device with a processing unit for use in a motor vehicle, which comprises a main control device. The processing unit is subordinate to the main control device.

"Intelligent" actuators are frequently used in modern motor vehicles. They usually incorporate a processing unit which is subordinate to a main control device, which in turn transmits control commands, for example actuator setting commands, to the processing unit. The processing unit receives the control commands from the main control device and is provided to control the actuator according to the commands transmitted from the main control device. This main control device operates as a master unit and the processing unit functions as the slave unit. Such a concept is described, for example, in the document WO 2006/061238, and corresponding US patent No. 2008/105502 A1, the US document being incorporated by reference herein, and enables power electronics for activating the actuator to be arranged so that it is spatially separate from the main control device. The communication between the main control device and the processing unit normally takes place via a data bus. In motor vehicles, such a bus is frequently a LIN bus, a CAN bus or a FlexRay bus.

Intelligent actuators of this type may be used in motor vehicles in particular for safety-related systems such as electronically controllable parking brake systems. Problems may occur, however, if incorrect signals are transmitted via the bus or if the actuator receives, for example via a short circuit, erroneous signals. If safety-related systems are affected by a fault of this kind, there could be serious consequences for the vehicle safety. For example, in the case of a parking brake, an incorrect signal may cause the parking brake to be released without control on a slope, or may lead to unexpected and undesired braking while the vehicle is travelling. Both situations may significantly prejudice the safety of the driver and passengers of a motor vehicle and that of other road users.

A safety concept that counteracts faults of this kind can usually only be implemented at great expense. The need therefore exists for a simple, cost-effective yet reliable system for increasing vehicle safety.

BRIEF SUMMARY OF THE INVENTION

The invention proposes for this purpose an actuator device for use in motor vehicles, which comprises an actuator, a control unit to control the actuator, and a processing unit. The processing unit is or can be connected to an external main control device via a control connection and is subordinate to the main control device. In particular, provision may be made whereby the main control device and the processing unit have a master-slave relationship. The control connection is able to transmit actuator setting commands. The processing unit is furthermore connected to the control unit in order to control the actuator according to the actuator setting commands. In addition, provision is made whereby the control unit is or can be connected with the main control device via an activation connection. The control unit is equipped so as to enable the actuator to be controlled by the processing unit according to activation signals transmitted via the activation connection. The activation control may be run in parallel to the control connection. The activation connection between the control unit and the main control device enables an independent entity to be created via which it can be determined whether or not control of the actuator is to be permitted via the processing unit. A considerable improvement in safety for the actuator device may thus be achieved in a manner that is easy to set up.

The actuator device may have a monitoring unit via which the main control device is connected to the control unit by the activation connection. Such a monitoring unit connected in the activation connection between the control unit and the main control unit may carry out an additional check on signals transmitted via the activation connection. In particular, provision may be made whereby the monitoring unit is connected to the processing unit for signal transmission. This enables communication to be established between the monitoring unit and processing unit. It is advantageous if the monitoring unit is configured to detect faults occurring during the activation connection or the control connection and to forward an error message or deactivate the actuator device, or both.

In a further development the actuator device is connected to two separately operable control components of the main control device. In this case the control unit may be connected via the activation connection to a first control component and the processing unit may be connected via the control connection to a second control component. The connection to separately operable components of the main control device increases the system redundancy and the communication via the activation connection may be carried out separately and independently of the communication via the control connection.

An advantageous implementation makes provision whereby the control unit is or can be connected to the main control device directly via the activation connection. A direct connection of this type may also be provided alternatively to or in addition to indirect connections, for example via a monitoring unit where one is available.

The control connection for connecting the processing unit to the main control device may be a data bus. In particular, provision may be made for the data bus to be a LIN bus, a CAN bus or a FlexRay bus. Via a bus of this type, as is frequently used in vehicle technology, it is possible for signals to be transferred in a simple and well defined way.

It is possible for the main control device to be connected to the processing unit via the activation connection in parallel to and separately from the control connection. In this way an additional redundancy level may be provided for communication between the main control device and the processing unit.

According to one variant, the activation connection is able to transfer actuator setting commands or signals corresponding to actuator setting commands from the main control device. In this case provision may be made in particular whereby signals transferred via the activation connection are encoded (for example by modulation of the voltage level, pulse width modulation or frequency modulation). In this way, in addition to pure activation signals which generally allow or do not allow (i.e. block) control, it is possible for further commands to be transferred to the control unit and/or monitoring or processing unit.

Provision may furthermore be made whereby the processing unit and/or the monitoring unit is able to compare signals or actuator setting commands transferred from the main control device via the activation connection with actuator setting commands transferred from the main control device via the control connection. The signals used for the comparison may be transferred to the monitoring unit or to the processing unit via the activation connection. If signals transferred to the monitoring unit are to be compared, provision is made whereby a signal transmission may take place between the monitoring unit and the processing unit.

The processing unit may be adapted to control the actuator only when the signals or actuator setting commands compared to each other correspond. In addition to or alternatively to this, it is possible for the monitoring unit to carry out the comparison or to receive a signal corresponding to the comparison carried out by the processing unit. If appropriate, the monitoring unit—on the basis of the signal received or comparison carried out—may refrain from forwarding an activation signal or corresponding signal to the control unit or may send an express blocking command to the control unit.

According to a further development the processing unit, the monitoring unit and the control unit are all connected to the main control device via the activation connection. This results in an extremely high level of redundancy of signal transmission via the activation connection between the main control device and the units of the actuator device connected to it.

The activation line may also be adapted to provide power to units connected to it such as monitoring unit, processing unit and control unit.

The proposed actuator device is particularly suitable to be used with an actuator to activate a vehicle parking brake. However, a multitude of other applications are possible in which intelligent actuators as described here may be used, for example airbag systems, seat-belt pretensioners or similar.

The invention also comprises an actuator system, which comprises a main control device and at least one actuator device as described above. In particular, this may be a vehicle parking brake system comprising one or more actuator devices of a vehicle parking brake.

It is particularly useful if signals that are compared to each other must be present within a predefined time window so that they can actually be deemed to correspond to one another. It is also advantageous if the activation signals present on the control device permit control by the processing unit only within a predefined time window. Different time windows may be provided for various signal comparisons. The length of these time windows should be tailored precisely to the embodiment of the actuator device used and to the purpose for which it is used.

The invention further covers a method for controlling an actuator device for use in a motor vehicle. In this method provision is made whereby a subordinate processing unit receives actuator setting commands which are transmitted via a control connection from a superordinate main control device. A control unit receives activation signals which are transmitted from the main control device via an activation connection. The processing unit further transmits control commands to the control unit on the basis of the actuator setting commands, and the control unit controls an actuator on the basis of control commands received according to received activation signals.

The method may also make provision whereby actuator setting commands or signals corresponding to actuator setting commands are transmitted via the activation connection by the main control device to the processing unit. Actuator setting commands or signals corresponding to actuator setting commands may furthermore be transmitted, via the activation connection, by the main control device to a monitoring unit connected to the main control device via the activation connection.

Furthermore, provision may be made whereby the actuator setting commands or signals corresponding to actuator setting commands transmitted via the activation connection are compared with actuator setting commands transmitted via the control connection by the processing unit and/or the monitoring unit, wherein the control of the actuator is performed or permitted only if the compared actuator setting commands or signals correspond to each other.

Other advantages of this invention will become apparent to those skilled in the art from the following detailed description of the preferred embodiments, when read in light of the accompanying drawings.

DETAILED DESCRIPTION OF THE INVENTION

Within this description a connection means a device for signal transmission or for transmission of electrical voltage or electrical power unless otherwise expressly mentioned. In particular, such a connection may comprise one or more electrical cables. Furthermore, when reference is made below to the transmission of signals or of actuator setting commands, this always means the transmission of one or more signals or actuator setting commands.

Figure 1:
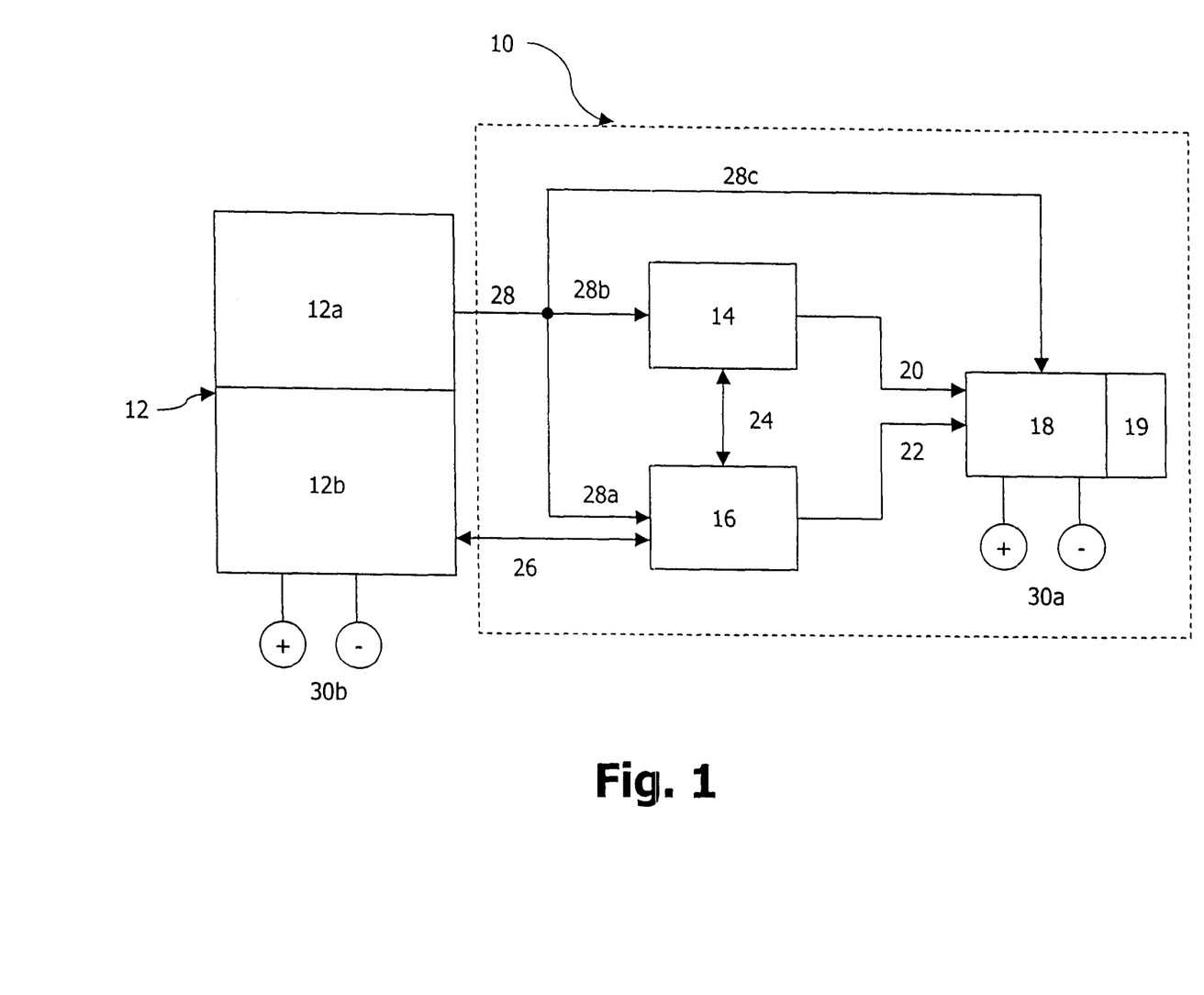
FIG. 1 is a schematic view of an embodiment of an actuator device.

FIG. 1 is a schematic view of an actuator device 10. The actuator device 10 has a monitoring unit 14, a processing unit 16 and a control unit 18. The control unit 18 is connected to an actuator 19 for the purpose of control. The actuator 19 may, for example, comprise a motor for releasing or activating a parking brake.

A connection 20 is provided between the monitoring unit 14 and the control unit 18. The control unit 18 is further connected to the processing unit 16 via a connection 22. The processing unit 16 and the monitoring unit 14 are able to communicate with each other via a connection 24. A voltage source 30a is provided to supply the actuator 19 with operating voltage. A vehicle battery (not shown), for example, may be used as voltage source 30a.

The actuator device 10 is provided for connection to a main control device 12. The main control device 12 may, for example, be a microprocessor of an on-board computer of a vehicle. The main control device 12 is preferably subdivided into two separately operable components 12a and 12b.

According to FIG. 1 the component 12b of the main control device 12 is connected to the processing unit 16 via a data bus 26 constituting a control connection. This data bus 26 is designed, for example, as a standardized data bus for data transmission in vehicles, such as—for example—a CAN bus, a LIN bus or a FlexRay bus. The main control device 12 is superordinate to the processing unit 16, and the main control device 12 and its components 12b and the processing unit 16 respectively form a master-slave pair. In a master-slave relationship of this kind, provision is made whereby the main control device 12 can control the access to the data bus 26, and the processing unit 16 cannot have write access to the data bus 26 without, for example, access rights issued by the main control device 12.

Furthermore, an activation line 28 is provided for connecting the components 12a of the main control device 12 to the actuator device 10. As shown in FIG. 1, the activation line 28 has three branches 28a, 28b and 28c. The component 12b of the main control device 12 is connected to the processing unit 16 via the branch 28a, to the monitoring unit 14 via the branch 28b and to the control unit 18 via the branch 28c. The activation line 28 is able to transmit analogue electrical signals with different signal levels. In particular, it is possible—by the signal level on the activation line 28—to show signals that completely or partially correspond to specific or to all actuator setting commands. The connection 20, as part of the activation connection 28, connects the control unit 18 indirectly via the monitoring unit 14 to the main control device 12.

A voltage source 30b is provided in order to supply electrical power to the main control device 12 and to its components 12a, 12b. The voltage source 30b may be identical to the voltage source 30a or may be a different voltage source.

The connections 20, 22 and 28 are shown in FIG. 1 such that the signals are transmitted in only one direction. However, it is of course possible for one, more than one or all of these connections to be configured so that signals may be transmitted in both directions. It is important, however, that a signal transmission is at least possible in the direction shown. For example, provision may be made whereby the control unit 18 may transmit data such as error signals to the monitoring unit 14 or to the processing unit 16, or both. The monitoring unit 14 and/or the processing unit 16 may also be configured and connected so that error signals may be transmitted to further components such as the main control device 12.

During operation provision is made whereby the component 12b of the main control device 12 transmit actuator setting commands to the processing unit 16 via the bus 26. The processing unit 16 forwards these actuator setting commands as control commands to the control unit 18 via the connection 22. In this way provision can be made whereby the processing unit 16 is able to convert or translate the actuator setting commands received from the main control device 12 or control component 12b into control commands that can be understood by the control unit 18 should this be necessary. It is also possible for control switches and power electronics elements to be used as the control unit 18. The processing unit 16 may in turn transmit signals to the main control device 12 via the bus 26. The monitoring unit 14 is able to participate in the control via the connection 20. In particular, provision is made whereby the monitoring unit 14 is adapted so that, depending on the situation, an activation signal or a signal corresponding to an activation signal is forwarded to the control unit 18, such a signal is not forwarded, or a blocking signal is sent to the control unit 18.

Provision is made whereby control of the actuator 19 according to actuator setting commands is carried out only if a corresponding activation signal is transmitted via the activation line 28.

In the actuator device 10 shown in FIG. 1 an activation signal may be transmitted via the branches 28a, 28b, 28c of the activation line 28 to the processing unit 16, the control unit 18 and the monitoring unit 14 respectively. This enables a check to be carried out in several places as to whether actuator setting commands transmitted via the data bus 26 have actually been correctly transmitted or even should have been transmitted at all.

One option for checking occurs directly at the processing unit 16, which receives actuator setting commands via the data bus 26 and corresponding signals (either activation signals only, or signals corresponding to the actuator setting commands) via branch 28a of the activation line 28. The processing unit 16 is able to determine whether the signals or actuator setting commands received via these two connections correspond to each other. In particular, provision may be made whereby the processing unit checks only whether an actuator setting command and a activation signal are present together. If signals that correspond to each other are present, the processing unit 16 transmits control commands to the control unit 18. If, on the other hand, there is no correspondence between the signals, the processing unit 16 assumes that there is an error and refrains from forwarding the actuator setting commands. If an error is present the processing unit may transmit error reports, for example, to the main control device 12 or to a different unit or other component of the vehicle electronics. This takes place advantageously via the data bus 26.

Furthermore, the monitoring unit 14 receives signals via branch 28b of the activation line 28. The monitoring unit 14 may exchange data with the processing unit 16 via the connection 24. This enables a check to be carried out as to whether the commands transmitted to the processing unit 16 correspond to the commands transmitted to the monitoring unit 14. This means that either of the units 14, 16 may transmit data, via the connection 24, to the other unit concerned, which then carries out the check. In particular, provision may be made whereby the monitoring unit 14 sends data to the processing unit 16, which compares the signals received from the monitoring unit 14 with those that it has received itself. The comparison and/or checking for correspondence may take place on the basis of the activation signals received by the processing unit 16 or on the basis of the actuator setting commands, or both.

Provision may further be made whereby the monitoring unit 14 transmits signals to the control unit 18 via the line 20 on the basis of the result of comparison or check. If the compared signals correspond to one another, the monitoring unit 14 may forward the activation signals or signals corresponding to activation signals received by it to the control unit 18. If there is no correspondence, the monitoring unit 14 refrains from forwarding the activation signals or transmits a blocking signal to the control unit 18, whereupon the latter refrains from permitting the control of the actuator 19.

Furthermore, activation signals are transmitted to the control unit 18 via branch 28c of the activation line 28. The control unit 18 is adapted to control the actuator only according to the processing unit 16 if an activation signal is transmitted via the activation line 28c to the control unit 18.

Figure 2:
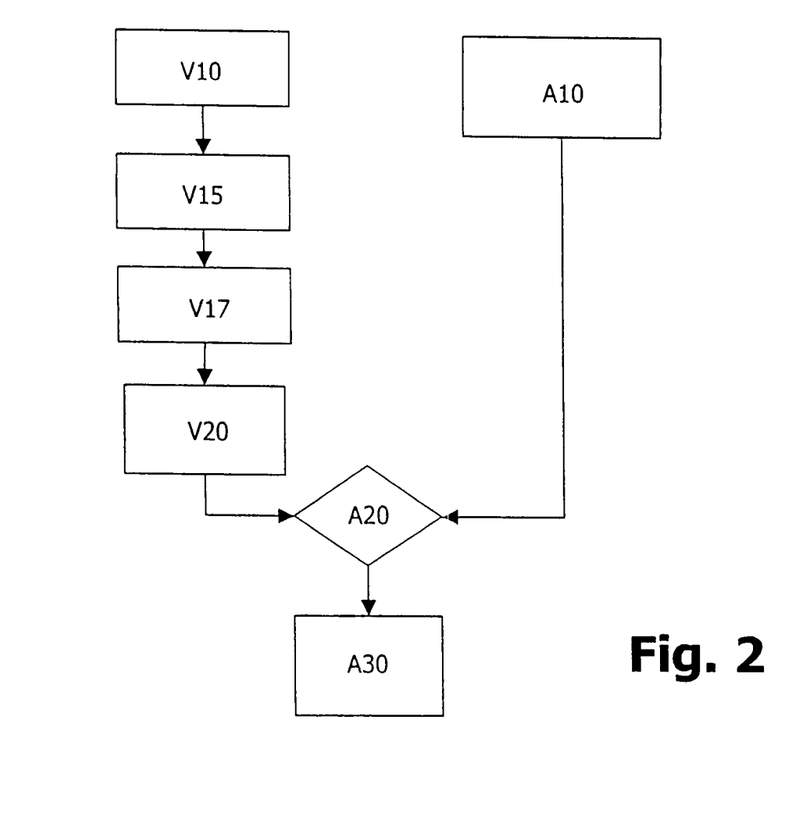
FIG. 2 is a flow chart showing an embodiment of a method for controlling an actuator.

FIG. 2 is a basic schematic diagram showing a flow of a method for controlling an actuator of an actuator device. This may be an actuator device 10 as shown in FIG. 1.

In stage V10 a processing unit receives actuator setting commands which a main control device transmits via a control connection. Provision may be made whereby the processing unit receives activation signals in stage V15, which are transmitted from the main control device via an activation connection. These stages V10 and V15 may take place simultaneously or with a slight time delay, in which case it is irrelevant which stage takes place first. The processing unit then checks, in stage V17, whether the activation signals and the actuator setting commands correspond, in particular whether the activation signals correspond to the transmitted actuator setting commands. If this is the case, the processing unit transmits control commands to a control unit in stage V20 on the basis of the actuator setting commands received. Stages V15 and V17 are optional in this case.

In parallel to stages V10 to V20, in stage A10 the control unit receives activation signals which the main control device transmits via the activation line.

In stage A20 the control unit checks whether activation signals received by it correspond to control commands transmitted to it. In particular, the control unit may check whether a received activation signal is present that permits any control, or whether it permits only a certain type of control and corresponds to the relevant control command of the type of control permitted by the activation signal. If the control unit ascertains that signals and control commands that correspond to each other are present, in stage A30 control of the actuator is carried out by the control unit according to the control commands. A time lag between receipt of the respective signals and commands may be used as a benchmark for the correspondence of the signals and control commands. In particular, provision may be made whereby signals and commands correspond to each other only if they are present within a predefined time window.

Figure 3:
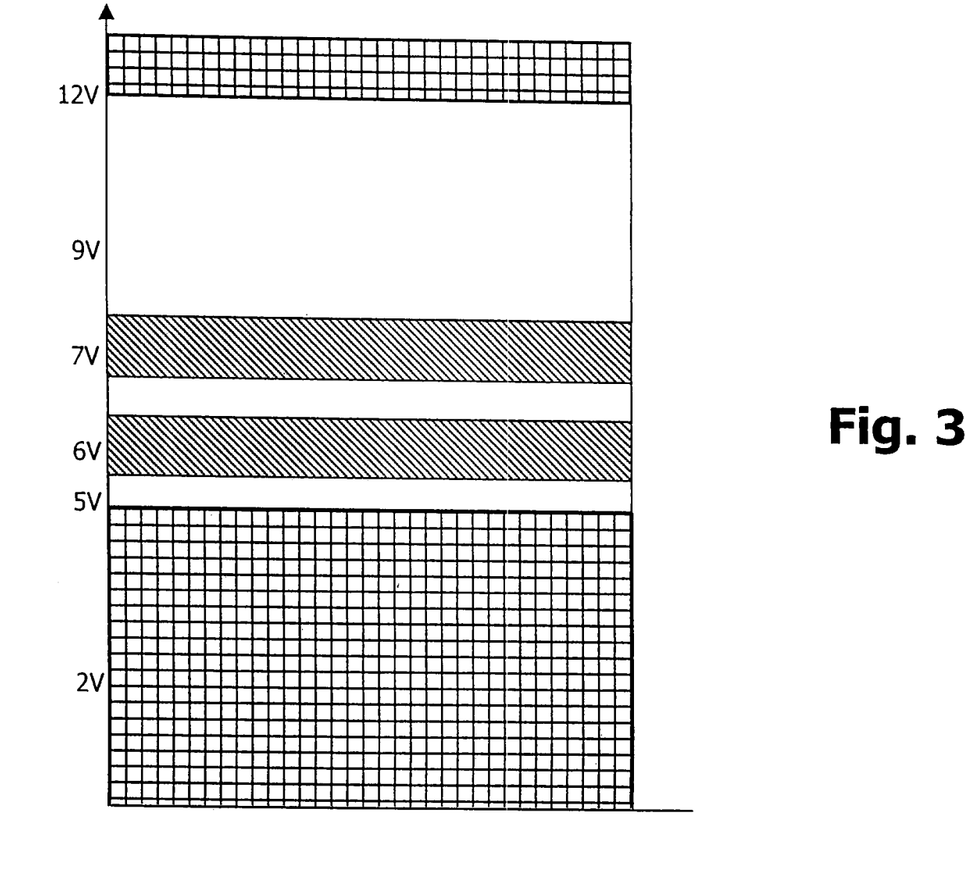
FIG. 3 shows a possible coding of signals transmitted via the activation connection.

FIG. 3 shows a possible coding of the signal level on the activation line, for example the activation line 28 shown in FIG. 1. It is assumed from this that the actuator may be opened and closed. Of course, end statuses other than open and closed—in particular non-binary end statuses—are possible for the actuator, for example such statuses that lead to a brake being applied and to a brake being released. In FIG. 3, voltage level ranges to which an activation function is assigned are shown cross-hatched, and those to which no particular activation function is assigned are left blank. Ranges within which no activation is possible are shown chequered. The breadth of the ranges in FIG. 3 is selected merely for clarification purposes; the actual signal level ranges that are still assigned to a target value may be adapted to the requirements of a system.

The signal incorporates a possible voltage range from 0 to 12 V. At a signal level of 12V or above it is assumed that there is a short circuit in an activation line and the control unit is deactivated; controlling of the actuator according to a processing unit is not possible.

Control of the actuator is likewise not possible below a level of 5V (low signal status). The activation range is therefore between 5V and 12V in this example. As soon as the signal level rises above 5V (high signal level) but remains below 12V, control of the actuator is possible in principle.

In the signal level range within which control is possible, specific voltage values are assigned specific setting commands or setting command types in addition. For example, a signal level of 6V represents an activation signal for closing the actuator; if the activation line runs a level of 6V, the control unit permits control by the processing unit only in order to close the actuator. A signal level of 7V, on the other hand, represents an activation signal for opening the actuator. If such a level is present, the control unit controls the actuator only in order to open it; other control commands from the processing unit are not executed. It is possible, of course, for provision to be made in such a coding whereby a signal level that is within the control range but exceeds several voltage values, to which different control types are assigned, permits all these control types. In the example shown in FIG. 3, a voltage level between 7V and 12V would then permit both the closing and the opening of the actuator. Furthermore, provision may be made whereby a signal level is defined in which all available types of control are permitted.

Figure 4:
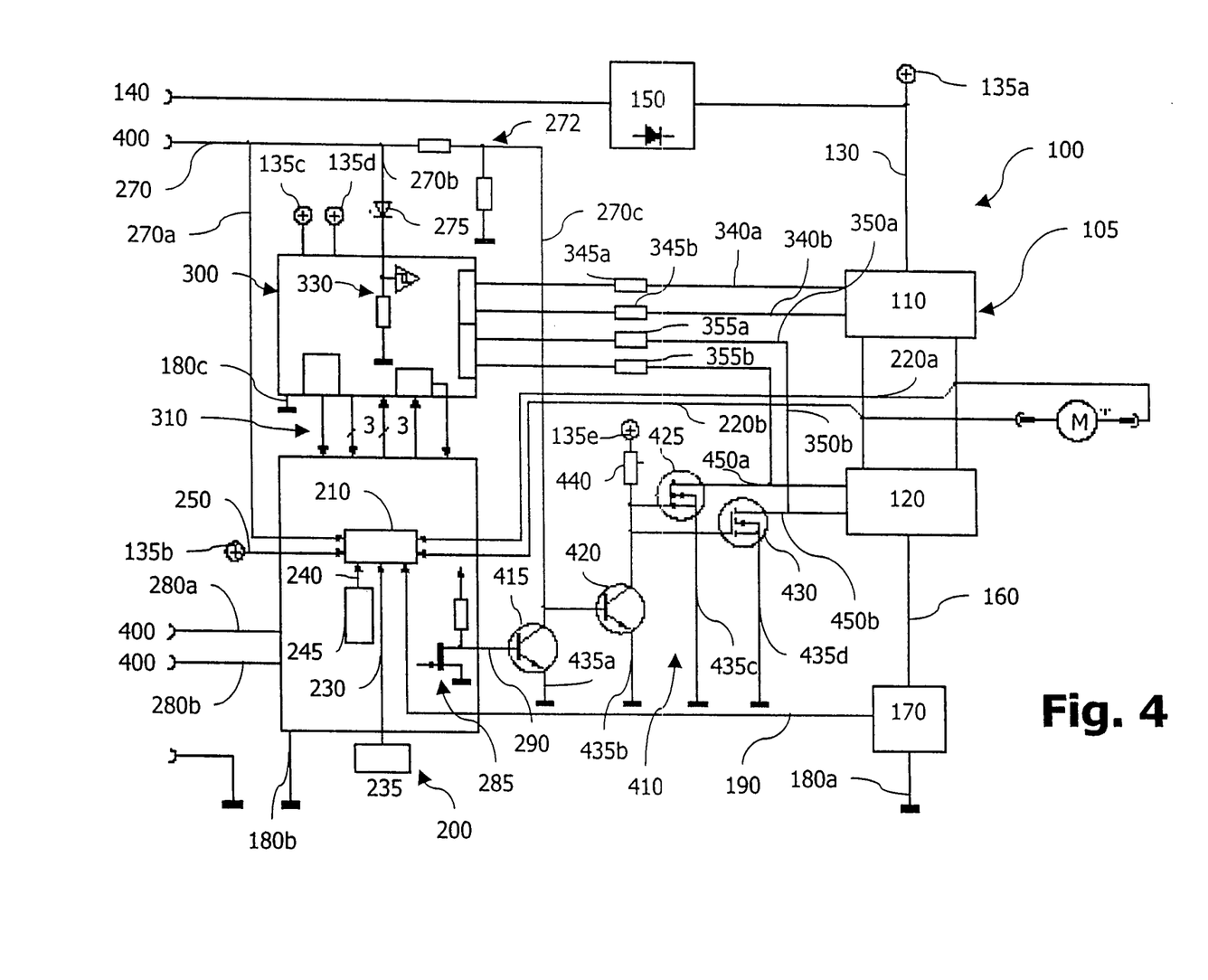
FIG. 4 is a detailed schematic view of a further embodiment of an actuator device which may be used in a motor vehicle-parking brake.

FIG. 4 shows an actuator device 100 in greater detail. The actuator device 100 has a motor M which functions as an actuator. The motor M is connected in the conventional manner via an H-bridge circuit 105 to two power transistors 110 on the upper surface and two power transistors 120 on the lower surface respectively (the bridge circuit is not shown in detail). The power transistors 110 and 120 are designed as field-effect transistors and are provided for actuation of the motor M. The power transistors 110 are connected to a positive pole 135a of a voltage source via a cable 130 in order to supply electricity to the power transistors, and to a fuse 140 of the vehicle, usually the K30 fuse. A diode array 150, which suppresses return power flow from the power transistors 110, 120 to the fuse 140, is connected between the fuse 140 and the power transistors 110. A current measuring device 170 is connected to the power transistors 120 via a cable 160. Furthermore, the current measuring device 170 is earthed via a cable 180a.

A cable 190 is connected for linking the current measuring device 170 to a processing unit 200. In this embodiment the processing unit 200 is a Freescale S08 microcontroller, which is not shown in full detail in FIG. 4. Other suitable microcontrollers may also be used as the processing unit 200; the precise number and type of connections and elements present in the microcontroller will then be different from the unit shown here.

The processing unit 200 incorporates an analogue-digital converter (ADC) 210, which is connected to the current measuring device 170 via the cable 190 for transmission of power measurement data. The analogue-digital converter 210 is furthermore connected to the bridge circuit 105 via two cables 220a, 220b. The signals relating to the actuator setting can be routed to the ADC 210 via the cables 220a, 220b.

An external temperature measuring device 235 is further connected to the ADC 210 via a cable 230. The ADC 210 is also connected via a cable 240 to an internal temperature measuring device 245 for measuring the temperature of the processing unit 200. A cable 250 connects the ADC 210 to a positive voltage pole 135b, which provides a voltage setting. The ADC 210 is furthermore connected to an external main control device 400 (not shown in greater detail) via a branch 270a of an activation line 270. The cables 280a and 280b represent a connection from the processing unit 200 to the main control device 400 via a CAN bus. A cable 180b provides an earth connection for the processing unit 200. Furthermore, the processing unit 200 incorporates a voltage regulator 285 which, on the basis of signals routed to the ADC 210 via the cables 220a, 220b, 270a, 230, 235, 240, 190, and on the basis of actuator setting commands transferred via the CAN bus 280a and 280b, outputs control commands for the motor M via a cable 290.

A monitoring unit 300 is connected to the processing unit 200 via cables 310. In the embodiment shown here the monitoring unit is an ATMEL ATA6823 unit which is connected in the conventional way via cables 310 to the Freescale S08 microcontroller, i.e. the processing unit 200. Here, likewise, it is of course possible for another suitable electronic component to be used as the monitoring unit 300. The details of the monitoring unit 300 will vary accordingly. The exact nature of the connection between the monitoring unit 300 and the processing unit 200 will depend in particular upon the components that are used as the processing unit 200 and monitoring unit 300.

In the constellation shown in FIG. 4, the cables 310 in the diagram comprise, from left to right, a cable for positive supply voltage (VCC), 3 status cables and 3 control cables, as well as a monitoring cable (WD) and a reset cable. The monitoring unit 300 is connected to positive voltage poles 135c, 135d by cables 320a, 320b. An earth cable 180c connects the monitoring unit 300 to earth. A Schmitt trigger circuit 330 is connected to the main control device 400 via a branch 270b of the activation line 270. The monitoring unit 300 is provided inter alia with a supply voltage via the branch 270b. A diode 275 is provided in the branch 270b to prevent return power flow. The monitoring unit 300 is connected via two cables 340a, 340b with resistors 345a, 345b for control of the upper power transistors 110 of the bridge circuit 105. In addition, the monitoring unit 300 is connected via cables 350a, 350b with resistors 355a, 355b to the lower power transistors 120 of the bridge circuit 105.

The activation line 270 also has a further branch 270c, in which a voltage divider 272 is installed. The branch 270c is connected to a control circuit 410. The control circuit 410 comprises transistors 415, 420, 425 and 430, which are connected to earth via cables 435a, 435b, 435c and 435d respectively. Furthermore, the control circuit 410 has a resistor 440 with a positive voltage pole 135e. The control circuit 410 is additionally connected to the processing unit 200 via the cable 290 and to the lower power transistors 120 for control via the cables 450a, 450b.

The branch 270c of the activation line 270 is connected to the control circuit 410 such that the transistor 415 is switched through only if a suitable activation signal is present on the activation line. The transistors 415, 420, 425, 430 are switched together so that the processing unit 200 can then activate the bridge circuit 105 and control the motor M via the cables 290 and 450a or 450b.

In accordance with the provisions of the patent statutes, the principal and mode of operation of this invention have been explained and illustrated in its preferred embodiment. However, it must be understood that this invention may be practiced otherwise than as specifically explained and illustrated without departing from its spirit or scope.

The invention claimed is:

1. An actuator device for use in a motor vehicle, the actuator device comprising:
   an actuator;
   a control unit to control the actuator;
   a processing unit connected to the control unit for the transmission of actuator setting commands, the control unit being operable to allow control of the actuator by the processing unit as a function of actuation signals transmitted via a connection between the processing unit and the control unit;
   an external main control device, the external main control device having a first control component and a second control component with the second control unit being operable separately from the first control component;
   an activation connection that connects the control unit with the first control component of the main control device; and
   a control connection that connects both the first and second control components of the external main control device to the processing unit with the processing unit being subordinate to the second control component of the main control device and with the processing unit being connected to the control unit to control the actuator according to the actuator setting commands.

2. The actuator device according to claim 1, wherein the external main control device and the processing unit have a master-slave relationship.

3. The actuator device according to claim 1, wherein the actuator device also includes a monitoring unit, via which the main control device is connected with the control unit via the activation connection.

4. The actuator device according to claim 3, wherein for signal transmission the monitoring unit also is connected with the processing unit.

5. The actuator device according to claim 1, wherein the control unit is directly connected to the actuator and further wherein the control unit also is connected directly to the external main control device via a data bus constituting the control connection.

6. The actuator device according to claim 1, wherein the processing unit is or can be connected with the external main control device via a data bus constituting the control connection.

7. The actuator device according to claim 6, wherein the processing unit is connected with the external main control device separately and in parallel to the data bus via the activation connection.

8. The actuator device according to claim 1, wherein the activation connection is adapted to transmit actuator setting commands or signals corresponding to actuator setting commands in a redundant manner from the external main control device.

9. The actuator device according to claim 8, wherein the actuator setting commands are modulated onto activation signals.

10. The actuator device according to claim 4, wherein at least one of (i) the processing unit and (ii) the monitoring unit is adapted to compare actuator setting commands or signals corresponding to actuator setting commands transmitted from the main control device to the monitoring unit with actuator setting commands or signals corresponding to actuator setting commands transmitted from the external main control unit to the processing unit.

11. The actuator device according to claim 6, wherein the processing unit is adapted to compare actuator setting commands or signals corresponding to actuator setting commands transmitted from the external main control unit to the processing unit via the activation connection with actuator setting commands transmitted from the external main control unit via the data bus to the processing unit.

12. The actuator device according to claim 11, wherein the processing unit is adapted to control the actuator only when the actuator setting commands or signals transmitted via the activation connection correspond to the actuator setting commands transmitted via the data bus correspond to each other.

13. The actuator device according to claim 10, wherein the monitoring unit is adapted to block control of the actuator when compared signals or actuator setting commands do not correspond to each other.

14. The actuator device according to claim 1, wherein the actuator is an actuator to activate a vehicle parking brake.

15. The actuator device according to claim 1 wherein the actuator device includes a plurality of actuators.

16. The actuator device according to claim 14 and a main control device wherein the actuator system is included in vehicle parking brake system.

17. A method for controlling an actuator intended for use in a motor vehicle, the method comprising the steps of:
   (a) providing an activation device that includes:
      an actuator
      a control unit to control the actuator
      a processing unit connected to the control unit for the transmission of actuator setting commands, the control unit being operable to allow control of the actuator by the processing unit as a function of actuation signals transmitted via a connection between the processing unit and the control unit;

an external main control device, the external main control device having a first control component and a second control component with the second control unit being operable separately from the first control component;

an activation connection that connects the control unit with the first control component of the main control device; and a control connection that connects both the first and second control components of the external main control device to the processing unit with the processing unit being subordinate to the second control component of the main control device and with the processing unit being connected to the control unit to control the actuator according to the actuator setting commands;

(b) receiving activation signals transmitted from the first component of the external main control device by a control unit via an activation connection;

(c) receiving actuator setting commands transmitted from a superior second component of the external main control device by a subordinate processing unit via a control connection;

(d) transmitting control commands by the processing unit to the control unit on the basis of the actuator setting commands;

(e) controlling the actuator, by the control unit, on the basis of control commands received by the processing unit according to the activation signals received.

18. The method according to claim 17 wherein the method also includes the step of:

transmitting actuator setting commands or signals corresponding to actuator setting commands from the main control device to the processing unit via the activation connection.

19. The method according to claim 17 wherein step (a) includes providing a monitoring unit and further wherein the method includes the step of:

transmitting actuator setting commands from the main control device to a monitoring unit via the activation connection.

20. The method according claim 18, wherein the method also includes the step of:

comparing actuator setting commands or signals corresponding to actuator setting commands transmitted via the activation connection with actuator setting commands transmitted via the control connection and further wherein the (e) of controlling the control unit by control commands transmitted from the processing unit on the basis of actuator setting commands to the control unit is performed only when the compared actuator setting commands or signals corresponding to actuator setting commands correspond to each other.

* * * * *